J. JOHNSTON.
MOTOR TRUCK.
APPLICATION FILED OCT. 30, 1914.
1,170,270.
Patented Feb. 1, 1916.
3 SHEETS—SHEET 3.
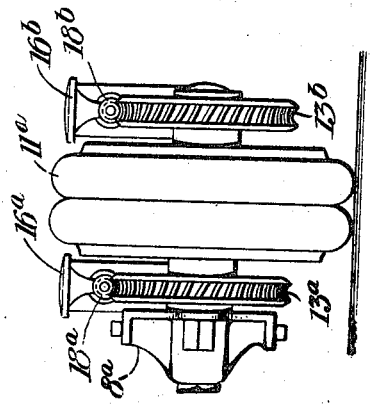
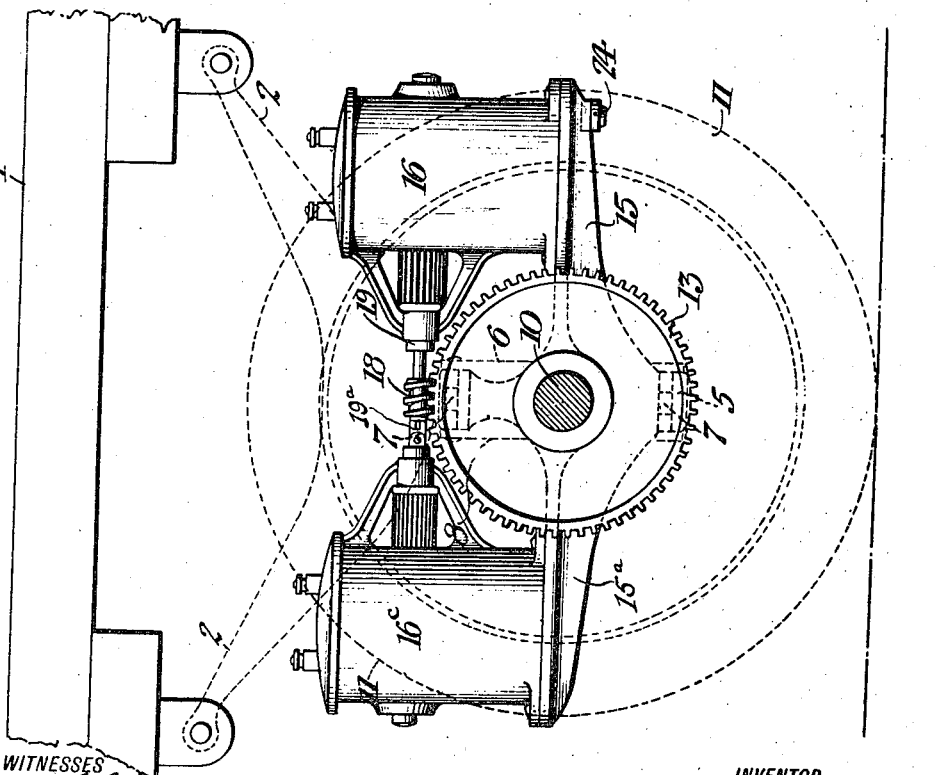
WITNESSES
INVENTOR
John Johnston.
BY
ATTORNEY

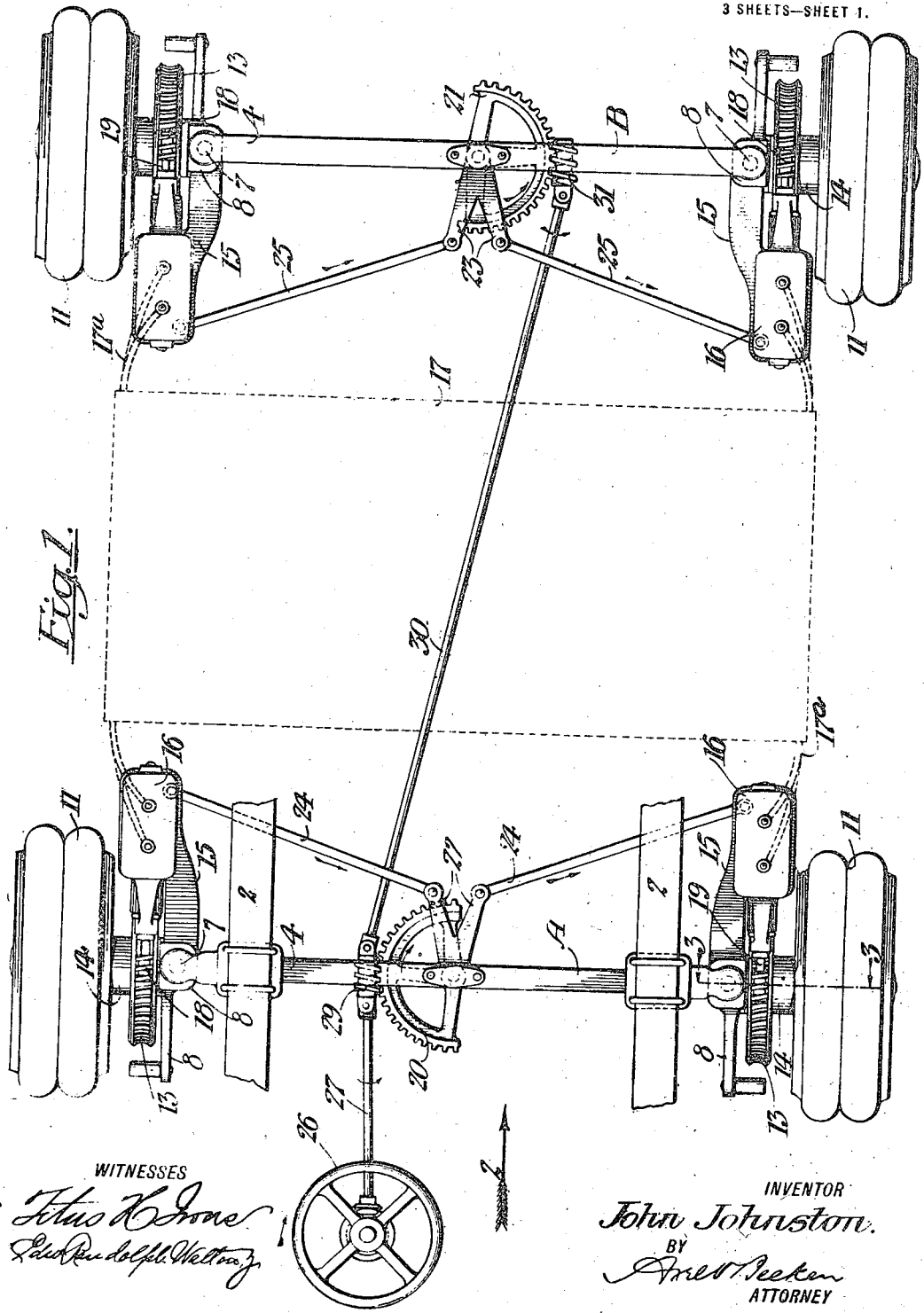

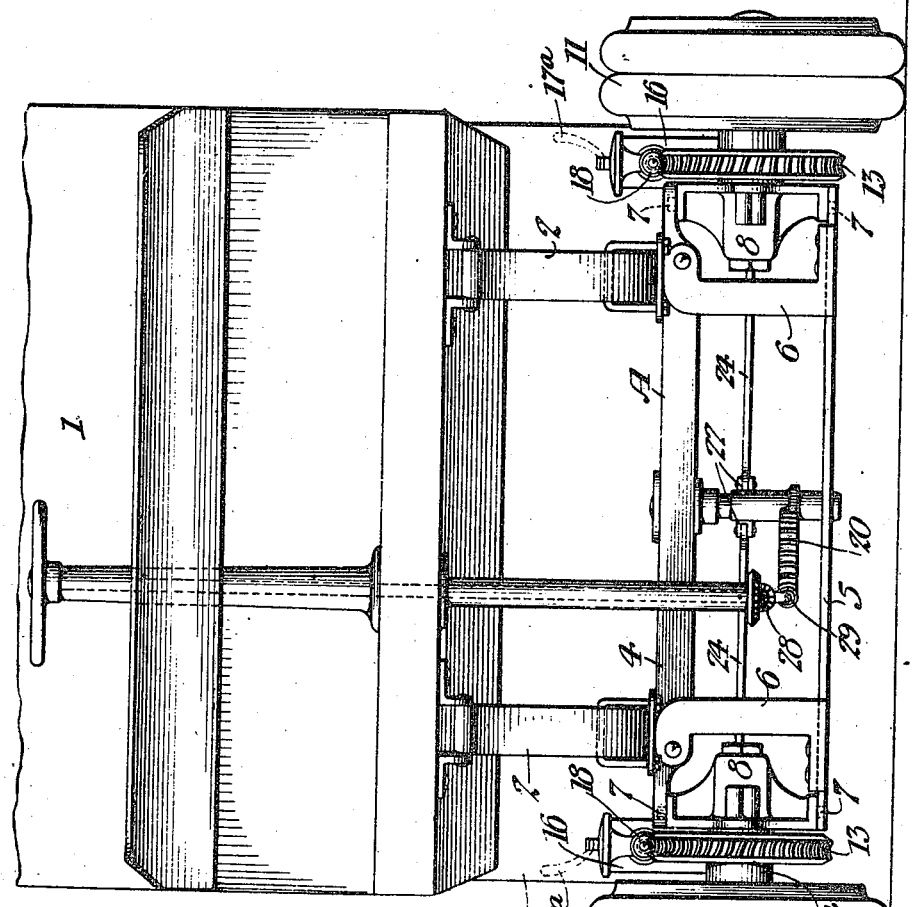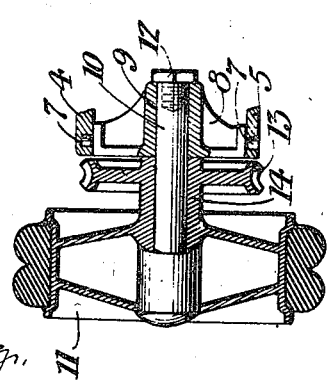

UNITED STATES PATENT OFFICE.

JOHN JOHNSTON, OF NEW YORK, N. Y.

MOTOR-TRUCK.

1,170,270.  Specification of Letters Patent.  Patented Feb. 1, 1916.

Application filed October 30, 1914.  Serial No. 869,413.

*To all whom it may concern:*

Be it known that I, JOHN JOHNSTON, a subject of the King of England, and a resident of New York city, in the county of New York and State of New York, have invented certain new and useful Improvements in Motor-Trucks, of which the following is a specification.

The invention relates to motor vehicles and has for its main object the production of a simple, inexpensive construction for driving directly from the drive-shaft of a motor each wheel of a vehicle independently of each other and which will eliminate the use of transmission and differential gearing in such vehicles.

The object further provides for a convenient disposition of the motor that will enable the same to be readily accessible for the purpose of repairing without necessitating the dismantling of any part of the running gear of the vehicle.

Still further the object of the invention provides for the application of the motor, in the manner above stated, to the wheels of the vehicle which may be operated by the steering gear thereof.

With these and other objects in view, which will appear as the specification proceeds, the invention consists in forming the turning knuckles, which connect the traction wheels with the bolsters of the vehicle, with an extension upon which a motor is mounted, and which latter directly drives a traction wheel through a worm, or other suitable gearing, on the drive-shaft of the motor.

Another feature resides in the construction of the steering gear which controls the traction wheels and governs the direction of travel of the vehicle.

So far as applicant is aware, motor vehicles have not been constructed with motors mounted on the turning knuckles of the steering gear for driving the wheels of the vehicle. By the present construction, applicant does not incase or inclose his motor but submits the same directly to the atmosphere so the same may be cooled thereby and so positions the motor to be easily accessible and to move in unison with the traction wheel.

Other features of construction and arrangement of part will appear as the specification proceeds.

The drawing accompanying the specification illustrates the invention in a concrete and preferred embodiment but it is to be understood that the invention is capable of many changes and modifications without departure from the spirit and scope of the invention as pointed out in the appended claims.

In the drawings: Figure 1 is a plan view of the running and steering gear of a truck, illustrating the invention. Fig. 2 is a front elevation of a truck illustrating the invention. Fig. 3 is a fragmentary detail sectional view of one of the traction wheels taken substantially on 3—3 of Fig. 1; to illustrate the connection of the wheels with the turning knuckles. Fig. 4 is an enlarged side elevation of the invention, the wheel being shown in dotted lines to bring out the construction of the turning knuckles and the location of the motor, and further illustrates a construction wherein the turning knuckle has two oppositely extending motor supports for accommodating two motors for driving a traction wheel. Fig. 5 is a front elevation of a traction wheel illustrating a modification wherein two motors are used for driving the wheel and are disposed on opposite sides thereof.

Like reference characters denote similar and like parts throughout the specification and drawings.

1 denotes the body of the vehicle or motor truck having the elliptical springs 2 suitably connected or secured to the front and rear bolsters A and B, respectively, which may be constructed in any desired manner, but which, as here shown, comprise the parallel bars 4 and 5 suitably spaced by the connecting members 6. Between the ends of each of these bolsters 4 and 5 are pivoted, or otherwise swiveled upon the pins or pivots 7, the knuckles 8 each formed with a central bore 9. A stub-shaft 10 extends through said bore and provides an axle for the traction wheels 11 which support the vehicle. The stud-axles 10 may be held in the bore 9 of the knuckles by any suitable means such as by the screw 12. A worm gear 13 is to be rigid with each traction wheel 11, which in the present instance is shown as being formed on its inner side with a sleeve 14 having integrally therewith the gear 13, however, this gear 13 may be secured to the wheel 11 in any preferred manner. Extending from each of the turning knuckles 8 is a shelf extension 15 to support a motor 16 of any preferred type, however, an electro-motor is shown in the present embodiment as receiving energy from the storage battery 17, suitably located on the vehicle, through conductors 17ª. A worm 18 is provided on the armature shaft 19 of the motor and meshes with the worm gear 13 for directly imparting motion to the traction wheels 11.

In Fig. 4 is illustrated a construction wherein the knuckle 8 is formed with two oppositely extending extensions 15 and 15ª for supporting motors diametrically opposite with respect to the gear 13. By this construction a second motor 16ᶜ may be placed upon the support or extension 15ª and suitably aid the motor 16 when it is desired to increase the driving power of the machine, etc. The motor 16ᶜ is preferably an electro-motor and has its armature shaft removably connected with the worm 18 as indicated at 19ª. The above construction allows for a double amount of power to be carried adjacent the wheel and to be exerted thereupon in an inexpensive and uncumbersome manner.

Supported on the bolsters A and B to rotate in a horizontal plane, are the segmental gears 20 and 21 having the levers 22 and 23 rigid therewith and to be operated thereby. Link rods 24 connect the knuckles 8 of the front bolster A with the lever 22, and link rods 25 connect the knuckles 8 of the rear bolster B with the lever 23 so that the traction wheels of each bolster will be operated in unison upon operation of the respective gears 20 and 21. The segmental gears 20 are actuated from the steering wheel 26 which imparts motion to the rotatable rod 27 through the bevel gears 28, the rod 27 having a worm 29 rigid thereon which meshes with the segmental gear 20, and the rod 27 in turn rotates the rod 30 which imparts motion to the worm 31, which latter meshes with the segmental gear 21. The worm 31 is so arranged that it will rotate gear 21 in an opposite direction to the gear 20 and thus turn the front and rear traction wheels in a coöperative relation for turning the vehicle, while the motor of each wheel is in operation, without necessitating the use of differential gearing. It is to be understood that although applicant shows all the traction wheels as being driven, it may be found desirable to drive only the front or rear wheels of the vehicle.

In Fig. 5 is shown a modification wherein two motors 16ª and 16ᵇ are used to drive a traction wheel. These motors are supported by the knuckle 8ª which is formed with an extension similar to the extensions 15 of the knuckles 8, but the extension of the knuckle 8ª, which former is hidden from view, is considerably broader to accommodate the two motors 16ª and 16ᵇ. The wheel 11ª is provided with two worm gears 13ª and 13ᵇ on opposite sides thereof which mesh with the worms 18ª and 18ᵇ, respectively, of the motors 16ª and 16ᵇ.

Applicant desires to make it clear that by the constructions, shown in Figs. 4 and 5, four motors may be applied to each wheel by merely broadening both the extensions 15 and 15ª to accommodate two motors, as shown in Fig. 5, respectively, whereby a quadruple source of power may be exerted upon a traction wheel and will be movable therewith without interfering with the proper rotation and operation of the same.

It is to be understood that the gears 13 may run into a suitable container filled with oil for the purpose of lubricating parts 13 and 18, or the same may be inclosed with a suitable casing which may contain oil.

What is claimed is:

1. In combination, a vehicle, a driven traction wheel for the vehicle, a turning knuckle pivoted in said vehicle, means projecting from the knuckle and providing an axle for the wheel, oppositely extending extensions formed on said knuckle, motors mounted on said extensions and having a single driving connection with said wheel, and a steering gear for the vehicle having an operative connection with said knuckle.

2. In combination, a vehicle, a driven traction wheel for the vehicle, a turning knuckle pivoted to said vehicle, means projecting from said knuckle providing an axle for said wheel, oppositely extending extensions formed on said knuckle, a motor mounted on one of the extensions and having a direct driving connection with said wheel, a second motor mounted on the other of said extensions and being removably connected with said driving connection of said first-mentioned motor, and a steering gear connected with said knuckle.

3. In combination, a vehicle, a driven traction wheel, for the vehicle, a turning knuckle pivoted to the vehicle, means projecting from said knuckle providing an axle for said wheel, oppositely extending extensions formed on the knuckle, each extension being of considerable width so as to support a motor on each side of the wheel, a motor mounted on each extension and on opposite sides of the wheel, a single driving connection between the wheel and each pair of motors on opposite sides of the wheel, and steering means connected with said knuckle.

4. In combination, a vehicle, a driven traction wheel for the vehicle, a turning knuckle pivoted to the vehicle, means projecting from the knuckle providing an axle for the vehicle, an extension formed on the vehicle and of considerable width to support a motor on oppoiste sides of the wheel, motors mounted on said extension on opposite sides of the wheel, driving connections between each motor and said wheel, and a steering wheel connected with said knuckle.

Signed at New York city, in the county of New York and State of New York this 28th day of October A. D. 1914.

JOHN JOHNSTON.

Witnesses:
EDWARD RANDOLPH WATTON, Jr.,
MARY W. WALLACE.